United States Patent Office 3,582,504
Patented June 1, 1971

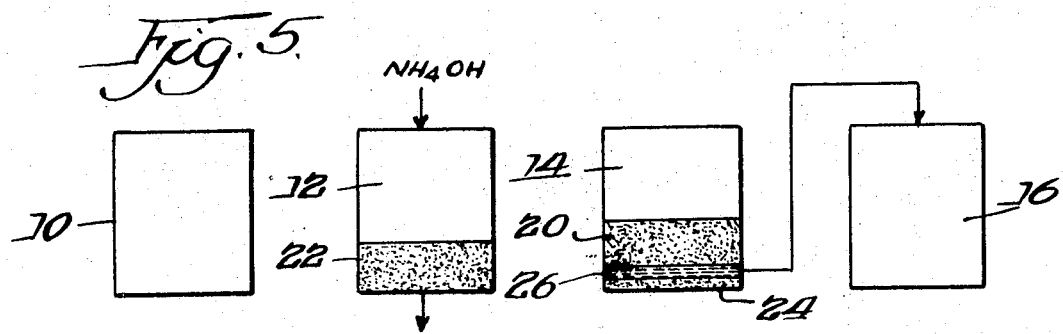
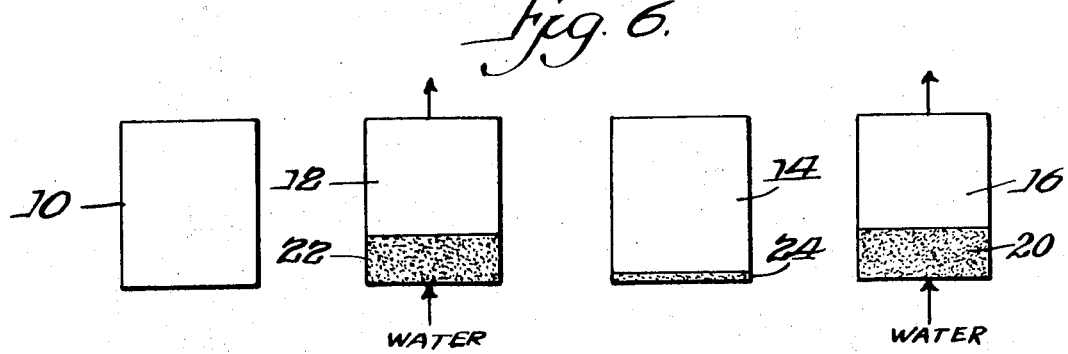
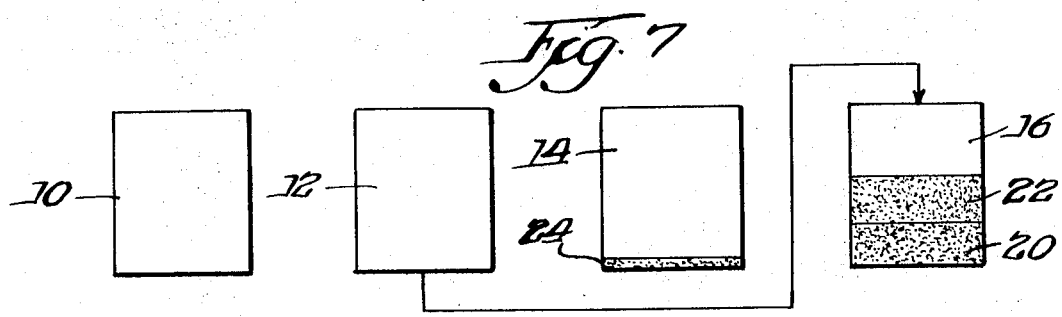
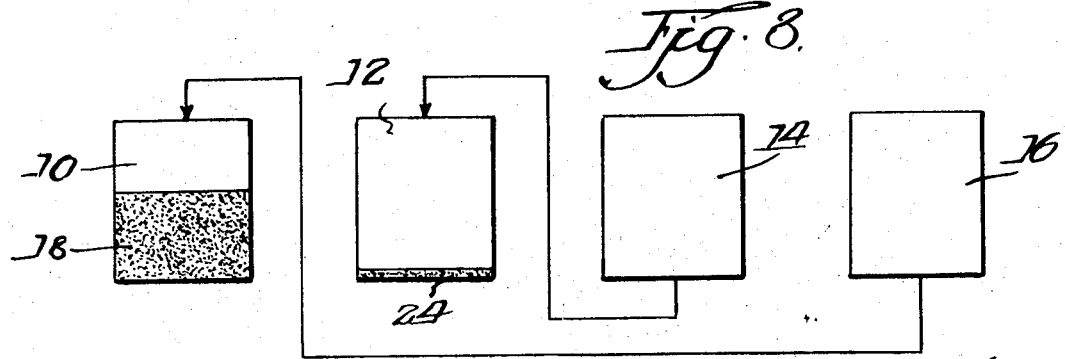

3,582,504
METHOD FOR SEPARATING AND ISOLATING ION EXCHANGE RESINS
Eli Salem, Brooklyn, N.Y., and Joseph H. Duff, Basking Ridge, N.J., assignors to Ecodyne Corporation, Chicago, Ill.
Filed Apr. 20, 1970, Ser. No. 30,137
Int. Cl. B01d *15/06;* C02b *1/70*
U.S. Cl. 260—2.1        7 Claims

ABSTRACT OF THE DISCLOSURE

In the regeneration of mixed-bed ion exchange resins, the resins are first separated in the conventional manner by an upflow of liquid. The resins are then isolated from one another, and contaminant cation exchange resin is separated from the anion exchange resin by floating the anion exchange resin in an intermediate-density liquid having a density intermediate between the cation and anion exchange resins. The contaminant cation exchange resin sinks to the bottom of the vessel, permitting the anion exchange resin to be readily isolated.

---

Figure 1:
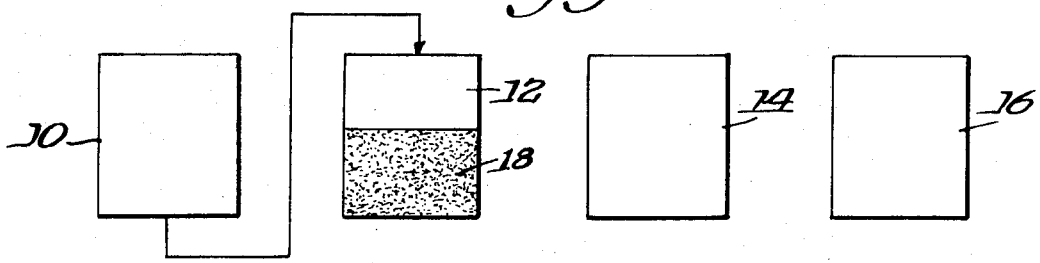

The present invention relates to an improved method for separating and isolating anion and cation exchange resins from one another, and more specifically to an improved method for treating water by ion exchange while substantially eliminating undesirable leakage.

Mixed bed systems containing anion and cation exchange resins for the purification of water have many industrial applications. A primary application of such a system is in the purification of water for condensate recirculation systems used to drive steam turbines. It is essential that this water be of an extremely high purity level in order to avoid any adverse effects on the surfaces of turbine blades, boilers, pipes, etc. Since it is desired to produce water that is free of any residue upon evaporation, the cation exchange resin must be in the hydrogen or ammonium form, and the anion exchange resin must be in the hydroxide form. In any event, it is conventional to regenerate the cation exchange resin with a strong acid such as sulfuric or hydrochloric acid, and to regenerate the anion exchange resin with a strong base, generally sodium hydroxide. After regeneration, the cation exchange resin may optionally be converted to the ammonium form. This conversion may be accomplished by treatment with ammonium hydroxide subsequent to regeneration. As an alternative, the conversion to the ammonium form takes place during the operation of the steam system, in which ammonium hydroxide is introduced into the water to prevent corrosion.

A particular problem with mixed bed ion exchange systems of the type conventionally employed is the production of ion "leakage," particularly sodium ion leakage. The term "leakage" refers to any ions that are not removed from the water by the ion exchange resin and, are thus permitted to "leak" past the resin. As used herein, the term "leakage" also refers to any undesired ions, such as sodium, which are introduced into the water by the resin itself.

The leakage problem arises primarily from the difficulty of obtaining perfect separation of the anion and cation resins in the mixed bed prior to regeneration of the resins. As is familiar to those skilled in the art, such separation is conventionally accomplished by passing water upwardly through the resins. This stream of water stratifies the resins by carrying the less dense anion exchange resin to the top of the separation vessel, while the more dense cation exchange resin is permitted to sink to the bottom. While this method is effective for separating the bulk of the resins, perfect separation cannot be achieved. A primary source of this difficulty is that resin fines are produced during handling of the resins. Since upflow separation depends upon particle size as well as density, the cation exchange resin fines will not sink to the bottom of the separation vessel, but will be carried upwardly with the anion exchange resin. When the resins are subsequently isolated from one another, and the anion exchange resin is regenerated with sodium hydroxide, sodium ions will be introduced into the ion exchange sites in the cation resin contaminant. When the resins are returned to the service column, the sodium ions will be introduced into the water being treated, producing sodium leakage.

As used herein, the term "separation" refers to the bulk classification of resins within a single vessel or zone. The term "isolation" refers to the transfer of resins so that they occupy separate zones.

Generally, the present invention provides an improved method for separating and isolating exhausted anion and cation exchange resins in a manner that achieves virtually complete isolation of the anion exchange resin from any contaminant cation exchange resin, thus significantly reducing any cation leakage. In carrying out the method, the resins are first separated in the conventional manner by passing a liquid upwardly through the resins to position the anion exchange resin in an upper layer and the cation exchange resin in a lower layer. The layers are then isolated from one another, so that the anion exchange resin occupies an anion resin zone and the cation exchange resin occupies a cation resin zone. An "intermediate-density liquid" is then delivered to the anion exchange resin. This intermediate-density liquid has a density intermediate between the densities of the anion exchange resin and cation exchange resin, i.e., greater than the anion exchange resin and less than the cation exchange resin. The intermediate density liquid is delivered to the anion exchange resin in an amount sufficient to cause the anion resin to float and the cation resin to sink. The thus separated anion exchange resin is then isolated from the contaminant cation exchange resin.

The invention will be best understood by reference to the following detailed description, taken in conjunction with the drawing, in which:

FIGS. 1–8 are diagrammatic flow charts illustrating the sequential steps of a preferred embodiment of the present invention.

As previously stated, in accordance with the present invention anion and cation exchange resins are first separated in the conventional manner with an upflow of liquid. As is well known in the art, complete separation of the resins cannot be achieved by this method, as a sharp interface between the anion and cation exchange resins is not formed. Thus, when the resins are isolated for regeneration, cation exchange resin, particularly cation resin fines, which contaminates the anion resin are converted to the sodium form. This sodium-form resin produces sodium leakage during the service cycle. According to the invention, these cation exchange resin contaminants are separated from the anion exchange resin by the use of an intermediate density liquid, which causes the anion resin to float, while permitting any contaminant cation resin to sink to the bottom of the tank. Because no upflow is involved, even cation resin fines are readily separated from the anion exchange resin.

Numerous intermediate-density liquids may be employed in accordance with the present invention, including organic liquids and aqueous solutions of inorganic compounds that have a density intermediate between the anion and cation exchange resins. The only essential for such a liquid is that it not damage the resin. A particularly suitable aqueous salt solution is a solution of sodium sulfate. Although such a solution converts the anion exchange resin to the sulfate form, sulfate anions are readily removed during the regeneration procedure.

In the most preferred embodiment of the invention, the intermediate density liquid is an aqueous solution of an alkali metal hydroxide, most preferably sodium hydroxide. Such a solution has the particular advantage that it regenerates the anion exchange resin at the same time that it separates the anion exchange resin from cation resin contaminants. Because the sodium hydroxide solution will be fairly concentrated (i.e., generally in the range of about 10 to 20 weight percent) a very high level of regeneration will be achieved.

As those skilled in the art will realize, a wide variety of tank or column arrangements may be employed to carry out the method of the present invention. Examples of suitable apparatus are described in my co-pending application, Ser. No. 859,042, filed Sept. 18, 1969, which is assigned to the assignee of this application.

The drawings show a diagrammatical illustration of an ion exchange system which is suitable for carrying out the present invention. For simplicity of illustration, these drawings are in flow sheet form, it being understood that connection between the various columns or tanks may be obtained by suitable piping. As previously stated, each of these tanks defines a suitable zone for the treatment of ion exchange resins. Thus, in the embodiment shown, there is a service column defining a service zone 10, a separation column defining a bulk resin separation zone 12, a contaminant separation column defining a contaminant separation zone 14, and a holding column defining a holding zone 16. In a system of the type illustrated, there will ordinarily be a plurality of service columns, forming a plurality of service zones 10, which are taken out of service one at a time for regeneration of the exhausted ion exchange resins. However, for simplicity, the embodiment shown in the drawings employs only one service zone 10.

FIG. 1 shows the initial transfer steps, wherein the mixed bed of completely or partially exhausted cation and anion exchange resins is transferred from the service zone 10 to the bulk resin separation zone 12. The mixed resins in the separation zone 12 are indicated by reference numeral 18.

Figure 2:
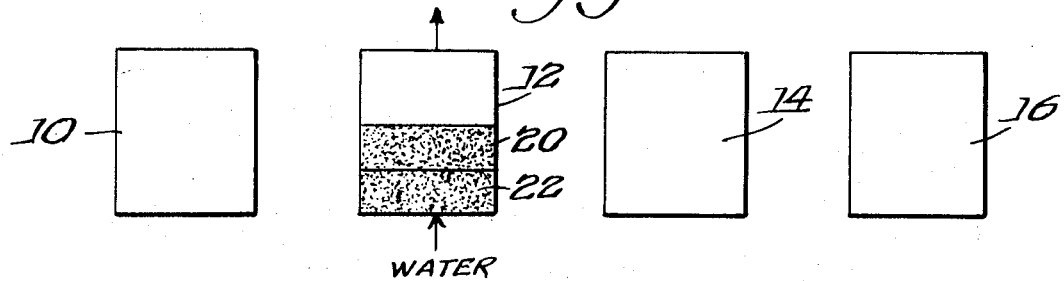

Referring to FIG. 2, after the mixed resins 18 are transferred to the separation zone 12, the resins are stratified by passing a liquid upwardly through the resins. This liquid will ordinarily be water, and is delivered upwardly through the resins at a rate that is sufficient to stratify the resins by carrying the less dense anion resin to a position above the cation exchange resin. The resins are shown in stratified condition in FIG. 2, with the anion resin 20 on top and the cation resin 22 forming a lower layer.

Figure 3:
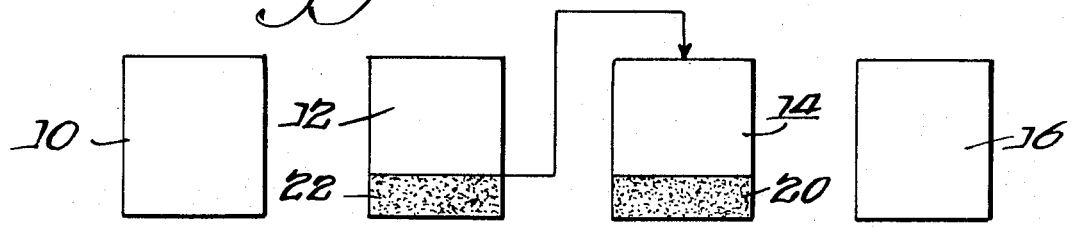

Subsequent to the stratification, the resins are isolated from one another. In the preferred embodiment, the isolation is accomplished by transferring the anion exchange resin 20 to the contaminant separation zone 14 as shown in FIG. 3.

Although the drawings show a sharp interface between the anion and cation exchange resins 20, 22, respectively, in the separation column 12, as previously stated such a sharp interface is not actually formed. Accordingly, the transfer of anion resins as shown in FIG. 3 may be performed at various positions in the bulk resin separation zone 12, according to whether it is desired to transfer an anion-rich cut, a cation-rich cut, or something between the two. That is, the higher the communication point of the transfer pipe with the bulk resin separation zone 12, the more anion-rich the cut will be. In the method of the present invention, it is generally preferred to transfer a cation-rich cut, i.e., a cut that transfers most of the resin in the interface area to the contaminant separation zone 14. However, this is not essential to the present invention.

Figure 4:
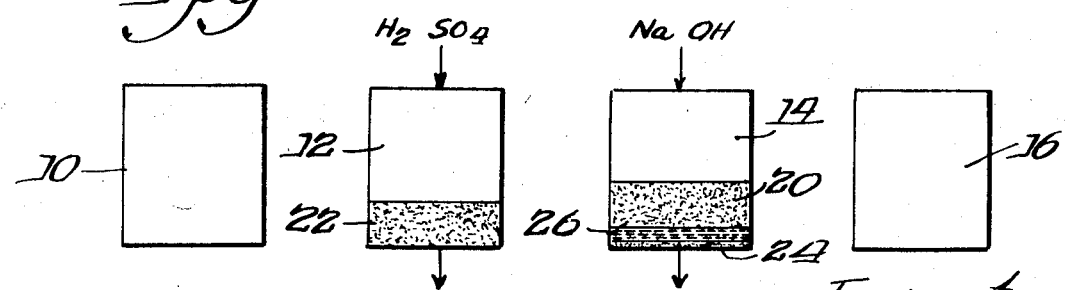

Referring to FIG. 4, an intermediate-density liquid is next delivered to the anion exchange resin in the contaminant separation zone 14. This intermediate-density liquid causes the anion exchange resin 20 to float, while contaminant cation exchange resin 24 sinks to the bottom of the contaminant separation zone 14. Preferably, sufficient intermediate density liquid is delivered to the contaminant separation zone 14 to produce a separation or gap containing liquid only between the anion exchange resin 20 and the contaminant cation exchange resin 24 which settles out. This gap is indicated in FIG. 4 by reference numeral 26.

Preferably, the intermediate-density liquid is delivered downwardly through the resin in the anion regeneration zone 14 for a period of time sufficient to agitate the resin, and to remove any diluents from the zone 14, in order to be certain that the intermediate density liquid is of the proper density.

In the preferred embodiment shown in the drawings, the intermediate-density liquid is an aqueous solution of sodium hydroxide. Thus, the intermediate-density liquid performs the dual function of separating the anion exchange resin 20 from the contaminant cation exchange resin 24, and also of regenerating the anion exchange resin 20.

As shown in FIG. 4, the cation exchange resin 22 in the bulk resin separation zone 12 is also regenerated with a suitable regenerant. For purposes of illustration, the regenerant indicated in FIG. 4 is sulfuric acid. As those skilled in the art will realize, other suitable regenerants may be employed, and the particular regenerant used forms no part of the present invention.

Referring to FIG. 5, if it is desired to ammoniate the cation exchange resin, ammonium hydroxide is passed through the resin in the bulk resin separation zone 12 at this time.

As shown in FIG. 5, the anion exchange resin 20 is transferred to the holding zone 16. This transfer is preferably accomplished by means of a transfer pipe that communicates with the anion regeneration zone 14 at a point that intercepts the gap 26 between the anion exchange resin 20 and the contaminant cation exchange resin 24.

Referring to FIG. 6, the anion and cation exchange resins 20, 22, respectively, are rinsed. If a non-regenerant intermediate density liquid had been employed (e.g. sodium sulphate), the resin would be regenerated in the holding zone 16 at this time. This regenreation would, of course, be followed by a rinsing step. Referring to FIG. 7, the cation exchange resin 22 in the bulk resin separation zone 12 is now transferred to the holding zone 16, where it is mixed with the anion exchange resin 20.

As shown in FIG. 8, the mixed resins in the holding zone 16 are next returned to the service column 10. Aso, the contaminant cation exchange resin 24 is transferred from the contaminant separation zone 14 to the separation zone 12, where it will be mixed with the next batch of exhausted resin. In FIG. 8, the system is ready for delivery of another charge of exhausted resins from another service zone 10 to the bulk resin separation zone 12.

The density of the intermediate density liquid employed in the present invention depends upon the densities of the particular anion and cation exchange resins that are being employed. The only essential factor is that the density of the intermediate density liquid be between the densities of the anion and cation exchange resins. As a general matter, the intermediate density liquid should have a specific gravity between about 1.088 and 1.17.

The manner of transferring resins between zones in the foregoing description is familiar to those skilled in the art and any of the conventional methods may be employed. For example, water pressure, air pressure, or combinations of the two are highly suitable.

The method of the present invention is adaptable to use with a wide variety of anion and cation exchange resins, the only essential being is that they differ in density. Typical solid cation exchange resins that may be employed in the present invention are those of the divinylbenzene-styrene copolymer type, the acrylic type, the sulfonated coal type, and the phenolic type. Typical solid anion exchange resins that may be employed in the present invention are the phenol-formaldehyde type, the divinylbenzene-styrene type, the acrylic type, and the epoxy type. The anion and cation exchange resins are both preferably employed as beads in the size range of about 16–60 mesh. Suitable bead resins are sold under the trade names Amberlite, Duolite, and Dowex. Particularly suitable cation exchange resins are sold under the trade names Amberlite IRA–200 and IRA–120, Duolite ES–26, and Dowex HCR–W. Suitable anion exchange resins are sold under the trade names Amberlite IRA–900 and IRA–400, and Duolite ES–109, and Dowex SBR.

The following examples are intended to illustrate the present invention, and should not be construed as limitative, the scope of the invention being determined by the appended claims.

EXAMPLE I

A service column forming part of a makeup water system for a condensate water recirculation system was charged with 100 cubic feet Duolite ES–109 anion exchange resin and 200 cubic feet of Duolite ES–26 cation exchange resin. After the resins were exhausted, they were transferred to a separation column under the influence of both air and water pressure. The resins were separated in the separation column with an unflow of liquid delivered at a rate of 4 gallons per minute per square foot of resin. This resin area is measured perpendicularly to the flow of water.

Subsequent to the separation, the upper layer of anion exchange resin, along with some contaminant cation exchange resin was transferred to a contaminant separation column. This resin was backwashed in order to clean it, at a backwash rate of 4 gallons per minute per square foot. The water was then drained from the contaminant separation column to below the level of the bed.

A 10% solution of sodium-hydroxide having a specific gravity of 1.10 at 120° F. was introduced into the contaminant separation column. The sodium hydroxide solution was introduced at the rate of 215 pounds of solution per minute over a period of 70 minutes. Sufficient solution was introduced to raise the bed level six inches above its original position, and the drain was then opened while the remainder of the solution was introduced. The drain valve was regulated in order to maintain the bed at 6 inches above its original position. This caused a gap to be produced between the anion exchange resin and the contaminant cation exchange resin, which sank to the bottom of the contaminant separation column.

The regenerated anion exchange resin was next transferred to a holding column. This transfer was accomplished through a pipe that communicated with the contaminant separation column at a level even with the gap produced by the sodium hydroxide solution between the anion exchange resin and the contaminant cation exchange resin. Thus, all of the contaminant cation exchange resin that had sunk to the bottom of the column was left behind. The anion exchange resin was rinsed in the holding column.

The cation exchange resin was regenerated with sulfuric acid in the separation column, and then rinsed and transferred to the holding column where the cation and anion exchange resins were mixed. The mixed resins were then transferred to the service column.

The contaminant cation exchange resin in the contaminant separation column was rinsed with water and transferred to the separation column, where it was available to be mixed with the next charge of the mixed exhausted resins.

Operation of the service column showed no detectable sodium leakage.

EXAMPLE II

Example I was repeated, except that 200 cubic feet of Dowex HCR–W cation exchange resin and 100 cubic feet of Dowex SBR anion exchange resin were employed. Rather than introducing concentrated sodium hydroxide into the anion exchange resin in the contaminant separation column, a 14% solution of sodium sufate was employed. This solution was introduced at 70° F., and had a specific gravity of 1.13. The sodium sulfate solution was introduced at the rate of 175 pounds per minute over a period of 60 minutes. Sufficient solution was introduced to raise the bed level 6 inches above its original position, and the drain was then opened while the remainder of the sodium sulfate solution was introduced. The drain was regulated in order to maintain the bed at 6 inches above its original level.

The anion exchange resin was separated from the contaminant cation exchange resin and transferred to a holding column by taking a cut in the gap between the resins as in Example I. The anion exchange resin was rinsed with 50 gallons per cubic foot of demineralized water. The resin was then regenerated by introducing an 8% solution of caustic at 120° F. After regeneration, the holding column was drained and rinsed. The subsequent steps were identical to those set forth in Example I.

Again, it was noted that the service column operated with resins regenerated in the indicated manner showed no detectable leakage.

Obviously, many modifications and variations as hereinbefore set forth will occur to those skilled in the art, and it is intended to cover in the appended claims all such modifications and variations as fall within the true spirit and scope of the invention.

I claim:
1. A method for separating and isolating exhausted anion and cation exchange resins from a mixed bed of said resins comprising: separating said resins by passing a liquid upwardly through said resins to position said anion exchange resin in an upper layer and said cation exchange resin in a lower layer; isolating said layers so that said anion exchange resin occupies a contaminant separation zone and said cation resin occupies a cation resin zone; delivering an aqueous sodium hydroxide solution to said anion exchange resin, said sodium hydroxide solution having a density intermediate between the densities of said cation and anion exchange resins, and said sodium hydroxide solution being delivered in an amount sufficient to cause said anion resin to float and said cation resin to sink, whereby to separate contaminant cation exchange resin from said anion exchange resin, and whereby to regenerate said anion exchange resin; and transferring one of said anion exchange resin and said contaminant cation exchange resin from said contaminant separation zone, whereby to isolate said anion exchange resin from said contaminant cation exchange resin.

2. A method for separating and isolating exhausted anion and cation exchange resins from a mixed bed of said resins comprising: separating said resins by passing a liquid upwardly through said resins in a bulk resin separation zone; transferring said anion exchange resin along with contaminant cation exchange resin to a contaminant separation zone; delivering an intermediate-density liquid to said contaminant separation zone in an amount sufficient to cause said anion exchange resin to float and said contaminant cation exchange resin to sink, said intermediate-density liquid having a density intermediate between the densities of said anion exchange resin and said cation exchange resin; transferring one of said anion exchange resin and said cation exchange resin from said contaminant separation zone, whereby to isolate said anion exchange resin from said contaminant cation exchange resin; and transferring said contaminant cation exchange resin to said bulk resin separation zone.

3. The method as defined in claim 2 wherein said intermediate-density liquid is an aqueous solution of sodium sulfate.

4. The method as defined in claim 2 wherein said intermediate-density liquid is an aqueous solution of sodium hydroxide, whereby to regenerate said anion exchange resin with said intermediate-density liquid.

5. A method for separating and isolating exhausted anion and cation exchange resins from a mixed bed of said resins comprising: separating said resins by passing a liquid upwardly through said resins in a bulk resin separation zone to position said anion exchange resin in an upper layer and said cation exchange resin in a lower layer; transferring said anion exchange resin along with contaminant cation exchange resin to a contaminant separation zone; delivering an aqueous sodium hydroxide solution to said anion exchange resin in said contaminant separation zone, said sodium hydroxide solution having a density intermediate between the densities of said cation and anion exchange resins, and said sodium hydroxide solution being delivered in an amount sufficient to cause said anion exchange resin to float and said contaminant cation exchange resin to sink, whereby to regenerate said anion exchange resin; regenerating said cation exchange resin; transferring said anion exchange resin to a holding zone; transferring said cation exchange resin to said holding zone; transferring said contaminant cation exchange resin from said contaminant separation zone to said bulk resin separation zone; and transferring said cation and anion exchange resins from said holding zone to a service zone.

6. The method as defined in claim 5 further comprising the step of ammoniating said cation exchange resin.

7. A method for separating and isolating exhausted anion and cation exchange resins from a mixed bed of said resins comprising: separating said resins by passing a liquid upwardly through said resins in a bulk resin separation zone; transferring said anion exchange resin along with contaminant cation exchange resin to a contaminant separation zone; delivering an aqueous solution of sodium hydroxide to said contaminant separation zone, said sodium hydroxide solution having a density intermediate between the densities of said anion exchange resin and said cation exchange resin, and said sodium hydroxide solution being delivered in an amount sufficient to cause said anion exchange resin to float and said contaminant cation exchange resin to sink; and transferring one of said anion exchange resin and said cation exchange resin from said contaminant separation zone, whereby to isolate said anion exchange resin from said contaminant cation exchange resin.

References Cited

UNITED STATES PATENTS

| | | | |
|---|---|---|---|
| 2,461,505 | 2/1949 | Daniel | 210—37X |
| 3,351,488 | 11/1967 | Zievers et al. | 210—33X |
| 3,385,787 | 5/1968 | Crits et al. | 210—33X |
| 3,501,401 | 3/1970 | Calmon | 210—33 |

REUBEN FRIEDMAN, Primary Examiner

C. M. DITLOW, Assistant Examiner

U.S. Cl. X.R.

210—33; 260—2.2